United States Patent
Homer et al.

(10) Patent No.: US 7,477,660 B1
(45) Date of Patent: Jan. 13, 2009

(54) DATA PROCESSING UNIT

(75) Inventors: Russell D. Homer, San Jose, CA (US); Olaf Moeller, San Jose, CA (US)

(73) Assignee: Infineon Technologies North America Corp., San Jose, CA (US)

(*) Notice: Subject to any disclaimer, the term of this patent is extended or adjusted under 35 U.S.C. 154(b) by 0 days.

(21) Appl. No.: 11/140,380

(22) Filed: May 26, 2005

Related U.S. Application Data

(63) Continuation of application No. 09/770,061, filed on Jan. 24, 2001, now Pat. No. 6,934,304.

(51) Int. Cl.
*H04J 3/06* (2006.01)

(52) U.S. Cl. .................................. 370/510; 398/155

(58) Field of Classification Search .............. 370/324, 370/503, 509–514; 398/50, 56, 154–155
See application file for complete search history.

(56) References Cited

U.S. PATENT DOCUMENTS

| | | | |
|---|---|---|---|
| 4,835,768 A | 5/1989 | Hubbard et al. | |
| 4,876,683 A | 10/1989 | Suzuki | |
| 5,608,734 A | 3/1997 | Sandler et al. | |
| 5,615,234 A | 3/1997 | Change et al. | |
| 5,640,398 A | 6/1997 | Carr et al. | |
| 5,710,774 A | 1/1998 | Suh et al. | |
| 5,854,816 A | 12/1998 | Kim et al. | |
| 5,970,139 A | 10/1999 | Koenig et al. | |
| 6,104,770 A | 8/2000 | Yama | |
| 6,157,657 A | 12/2000 | Humphrey et al. | |
| 6,169,501 B1 | 1/2001 | Ryan | |
| 6,173,380 B1 | 1/2001 | Jin et al. | |
| 6,256,326 B1 | 7/2001 | Kudo | |
| 6,339,601 B1 | 1/2002 | Seong et al. | |
| 6,359,908 B1 | 3/2002 | Soda | |
| 6,385,213 B1 | 5/2002 | Nakamura et al. | |
| 6,587,954 B1 | 7/2003 | Chiu | |
| 6,606,360 B1 | 8/2003 | Dunning et al. | |
| 6,625,240 B1 | 9/2003 | Miyahara | |
| 6,665,359 B1 | 12/2003 | Flake | |
| 6,715,093 B1 | 3/2004 | Farmer et al. | |
| 6,728,492 B1 | 4/2004 | Baroncelli | |
| 6,934,304 B2 * | 8/2005 | Homer et al. ............... 370/510 |

FOREIGN PATENT DOCUMENTS

| | | |
|---|---|---|
| EP | 0 403 663 A | 12/1990 |
| EP | 0 535 768 A | 4/1993 |
| WO | WO 02 15015 A | 2/2002 |

* cited by examiner

*Primary Examiner*—Bunjob Jaroenchonwanit
*Assistant Examiner*—Van Kim T Nguyen
(74) *Attorney, Agent, or Firm*—Slater & Matsil, L.L.P.

(57) ABSTRACT

A system and method for frame detection and generation. Each incoming clock-data stream is divided into two independent data streams: a clock path which preserves the timing of the individual clock domains and a data path which multiplexes an arbitrary number of data streams onto a parallel path. A framer array structure implements a context swap and synchronizes the data streams.

20 Claims, 3 Drawing Sheets

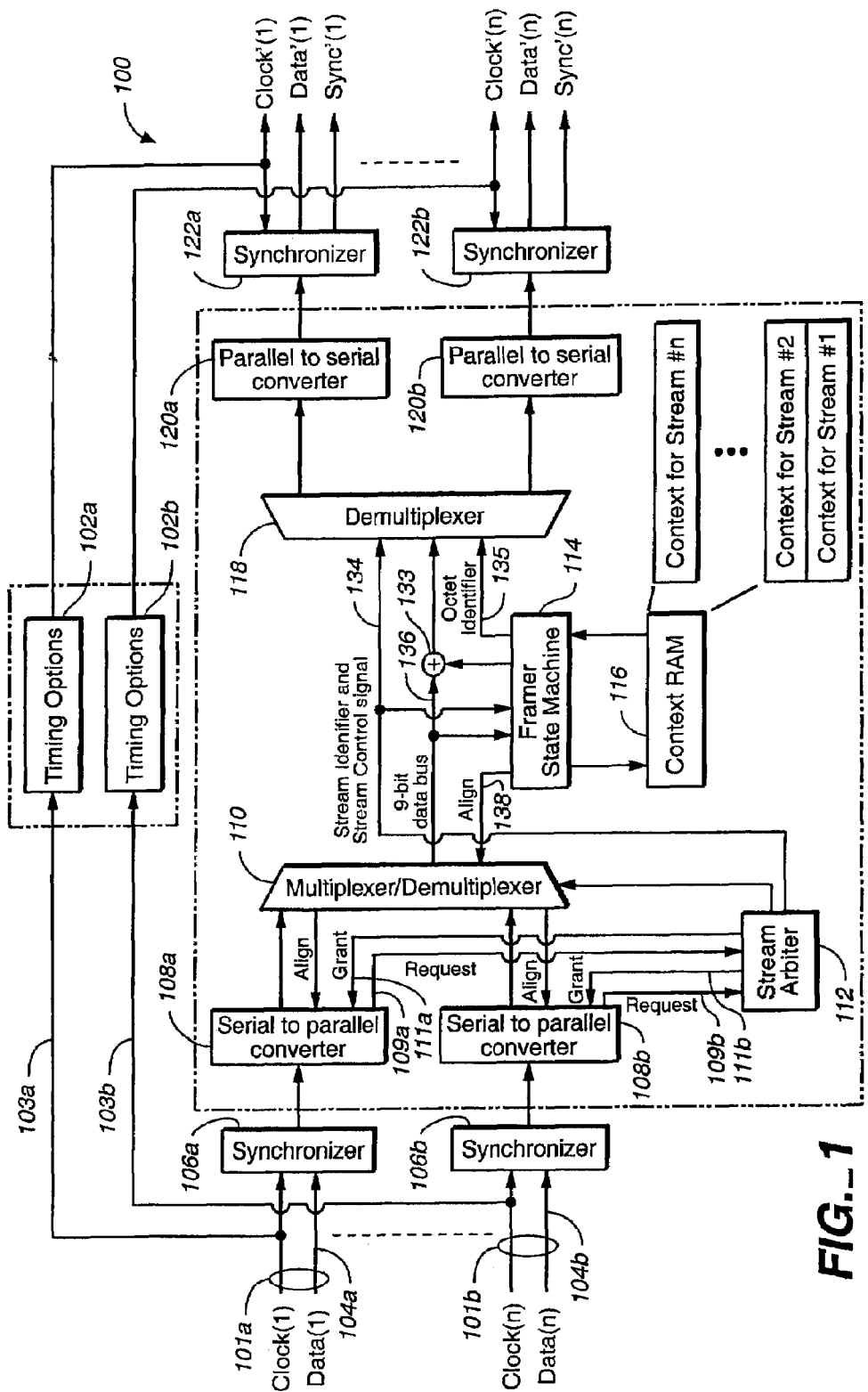
FIG._1

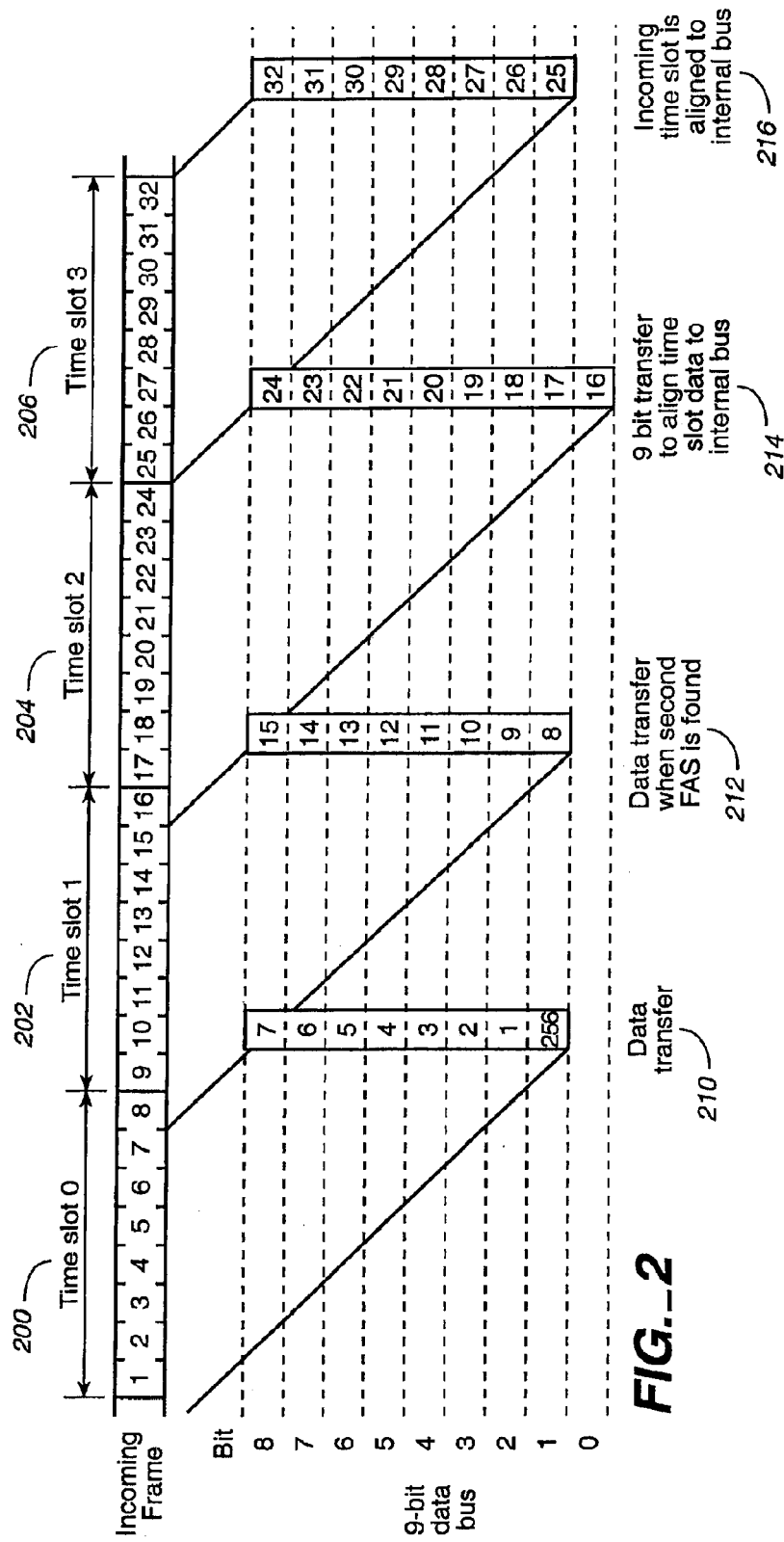
FIG._2

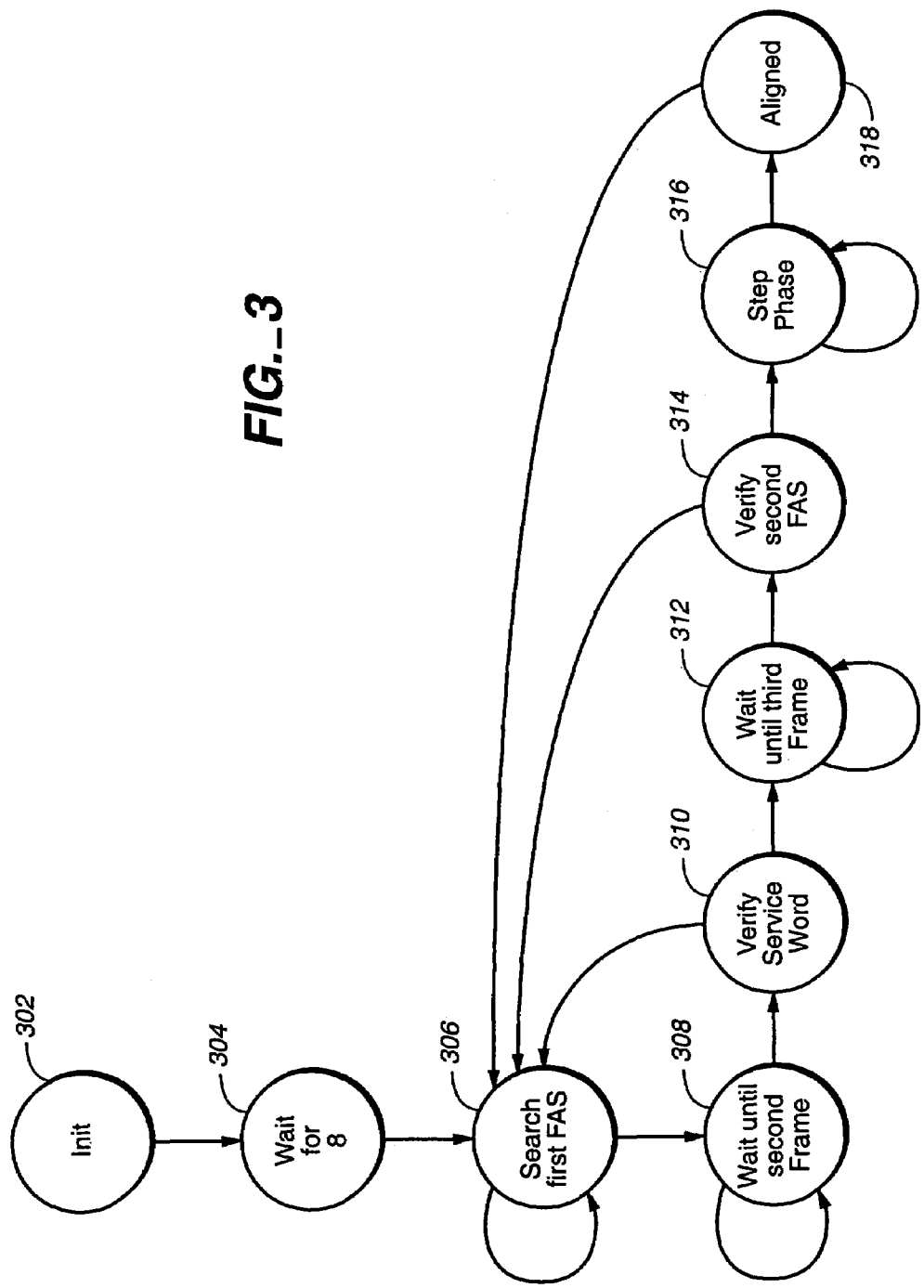
FIG._3

DATA PROCESSING UNIT

CROSS-REFERENCE TO RELATED APPLICATIONS

Under 35 U.S.C. § 120, this application is a continuation application of and claims priority to U.S. patent application Ser. No. 09/770,061, filed Jan. 24, 2001 now U.S. Pat. No. 6,934,304, the entire contents of which are incorporated by reference herein.

BACKGROUND OF THE INVENTION

1. Field of the Invention

The present invention relates to frame-detection and generation and, more particularly, to processing multiple independently-clocked data streams.

2. Description of the Related Art

Digital data transmission systems include facilities for frame detection and frame generation. In general, there are two approaches in the prior art for processing the individual data streams.

In a first conventional method, the frame detection and frame generation facilities are placed in directly in each data path in order to preserve the timing of the individual data streams. However, this requires replication of facilities and requires multiple, independent clock domains.

Another conventional approach uses state machine logic to handle multiple data streams by preserving the state of individual data streams in static RAM (random access memory). As used herein "state" or "context" of data streams refers to system register settings of a particular data stream. Each stream is typically processed as follows: (a) the prior state of the state machine is loaded out of RAM; (b) the stream is processed; (c) the current state is saved again; (d) the result is output from the state machine. While this approach is relatively efficient in terms of chip size, it does not preserve the timing of individual data streams.

There is therefore a need for an improved framer array architecture that preserves the timing of individual data streams and requires relatively less chip space.

SUMMARY OF THE INVENTION

These and other drawbacks in the prior art are overcome in large part by a system and method for frame detection and generation according to the present invention. Briefly, each incoming clock-data stream is divided into two independent data streams: a clock path which preserves the timing of the individual clock domains and a data path which multiplexes an arbitrary number of data streams onto a parallel path or bus. A framer state machine is provided to store and update the context of the data streams and to align the data stream to the bus.

The system may be implemented with synchronous logic operated with a high speed system clock. In particular, incoming data is synchronized to a common clocking domain, converted into a parallel format and forwarded via an internal bus to the outgoing port with a fixed delay. A framer array searches for the frame begin of each individual data stream and adds this information to the data stream. Finally, the data streams are aligned to the internal bus.

BRIEF DESCRIPTION OF THE DRAWINGS

A better understanding of the invention is obtained when the following detailed description is considered in conjunction with the following drawings in which:

FIG. 1 is a block diagram of a system according to an implementation of the invention;

FIG. 2 is a diagram illustrating frame alignment according to an implementation of the invention;

FIG. 3 is a state machine illustrating frame processing according to an implementation of the invention.

DETAILED DESCRIPTION OF THE INVENTION

FIGS. 1-3 illustrate an improved frame detection and generation system. Signal streams are divided into a clock stream and a data stream. Each stream is processed independently. A framer state machine is provided offset the path of the data streams to store and update the context of the data streams and to align the data stream to the bus.

Turning now to the drawings and, with particular attention to FIG. 1, a block diagram of a framer array according to an embodiment of the present invention is shown therein and identified by the reference numeral 100.

Shown are a plurality of incoming clock-data pairs 101*a*, 101*b* for receiving data streams. While only two such pairs are shown, in practice, multiple clock-data pairs may be utilized. The clock-data pair may transport data according to the International Telecommunications Union (ITU) T1 or E1 Standards.

Each incoming data path includes a clocking branch 103*a*, 103*b* and a data branch 104*a*, 104*b*. The clocking branch includes timing options 102*a*, 102*b* for each data path. The timing options 102*a*, 102*b* may be any suitable circuitry, such as application specific integrated circuits (ASICs), for extracting the clocks from the respective paths and may perform various functions on the clock, such as de-jittering.

Each data branch 104*a*, 104*b* includes a synchronizer 106*a*, 106*b* for receiving the incoming data streams. The outputs of the synchronizers 106*a*, 106*b* are serial data streams synchronous to a system clock (not shown) and are provided to serial-to-parallel converters 108*a*, 108*b*. The outputs of the serial-to-parallel converters 108*a*, 108*b* are provided to a multiplexer 110.

A stream arbiter 112 controls the output of the multiplexer 110. As illustrated, each serial-to-parallel converter 108*a*, 108*b* is connected via a request signal line 109*a*, 109*b* to the stream arbiter 112. Thus, once an incoming stream has been converted, the serial-to-parallel converter 108*a*, 108*b* sends a request along the request line 109*a*, 109*b* to the stream arbiter 112. The stream arbiter 112 provides a grant signal 111*a*, 111*b* to each serial-to-parallel converter 108*a*, 108*b* according to a predetermined selection algorithm. The stream arbiter 112 may implement any of a variety of known selection algorithms, such as round-robin, and the like. The stream arbiter 112 may be implemented as one or more embedded controllers or processors or ASICs.

The multiplexer 110 outputs a stream identifier 134 and parallel data on the 9 bit wide internal data bus 136. As will be described in greater detail below, the multiplexer 110 further receives an align signal 138 from a framer state machine 114, which is used to align the incoming data to the 9-bit data bus 136.

A frame state machine 114 and context RAM 116 are coupled to the stream identifier and stream control signal 134 and the 9-bit data bus 136. As will be described in greater detail below, the framer state machine 114 operates on the data streams by loading and storing the context of individual streams in the context RAM 116. "Context" is various information related to the data and streams. The framer state machine 114 identifies the start of frames of passing data streams using, for example, and of a variety of known search algorithms such as identifying a start of frame bit or bits. The framer state machine 114 further aligns the incoming data to the 9-bit data bus 136, as will be described in greater detail below. The framer state machine 114 may also insert alarms, a framing pattern, or similar information by adding such information via a multiplexer 133 to the 9-bit data bus 136. The framer state machine further outputs an octet identifier 135 to a demultiplexer 118.

The modified outgoing data stream is demultiplexed with the demultiplexer 118 onto parallel-to-serial converters 120a, 120b. The demultiplexer 118 uses the stream identifier 134 to identify the correct stream for demultiplexing. The outputs of the demultiplexer 118 are provided to parallel-to-serial converters 120a, 120b for conversion back to serial format. The serialized data streams are then re-synchronized to their original clocks in the synchronizers 122a, 122b.

During operation, data is placed on the 9-bit data bus 136 together with a stream identifier and stream control signals 134. When new data is placed on the internal bus, the framer state machine 114 loads the context of the stream to be processed. After processing of the data is finished, the framer state machine 114 stores the current context of the stream in its context RAM 116.

The framer state machine 114 calculates the frame position of the new stream in any of a variety of known manners. If the framer state machine 114 finds the frame boundary of the data stream and the data stream is not aligned, the framer state machine 114 aligns the time slots of the incoming frames to the 9-bit data bus 136. This is accomplished using the align signal 138, which informs the serial-to-parallel converter 108a, 108b to provide, for example, nine bits during the next data transfer. Thus, time slots of the frame will be aligned in a maximum of seven data transfers as the time slot can be shifted one bit per transfer.

This process of frame alignment is illustrated more clearly with reference to FIG. 2. Shown are Time Slot 0, Time Slot 1, Time Slot 2, and Time Slot 3 of an incoming frame.

During normal operation eight data bits are transported over the 9-bit data bus together with the respective stream identifier. As shown, the data bits transported over the 9-bit data bus 136 during the initial data transfer are misaligned to the incoming frame by one (1) bit. In particular, 210 shows a data transfer where bit 256 of a previous frame and bits 1 through 7 of the actual frame are transported over the 9-bit data bus 136. After the next transfer 212 the framer state machine 114 finds the frame begin. The framer state machine 114 detects the misalignment as described above and then requests a nine bit data transfer via the align signal 214 in order to align the data to the 9-bit data bus 136. 214 shows the following nine bit data transfer which aligns time slot 2 to the internal bus. If the frame and the time slot had been misaligned by more than one (1) bit, the process would repeat until the frame and time slot were aligned, as shown at 216.

A state diagram of framer state machine handling of the E1 double frame format is shown in FIG. 3. After startup, the framer state machine is in an initial state 302. When a data stream is enabled for operation, the framer state machine 114 enters a "Wait for 8" state 304. This state is implemented to fetch the first byte from the internal bus. Afterwards, the framer state machine enters a "Search for FAS (first frame alignment signal)" state 306. The framer state machine remains in this state as long as it hasn't found the frame alignment signal in the E1 stream. When found, the framer state machine 114 steps to the 'Wait until second frame' state 308. When the beginning of the second frame is reached, the framer state machine 114 moves on to the 'Verify Service Word' state 310. Here the framer state machine 114 checks the service word. If incorrect, it steps back into the 'Search for first FAS' state 306. Otherwise it steps to the 'Wait until third Frame' state 312. When the beginning of the third frame is reached, the framer state machine 114 steps forward to the 'Verify second FAS' state 314 where it checks again for the frame alignment signal. If incorrect, the framer state machine 114 goes back to the 'Search first FAS' state. Otherwise it goes forward to the 'Step Phase' state 316. In this state, the framer state machine 114 checks if the octet structure of the E1 frame is aligned to the internal data bus. When aligned, the framer state machine 114 moves forward to the 'Aligned' state 318. If the original stream is not aligned to the internal data bus, the framer state machine 114 remains in the 'Step Phase' state 316 until the stream is aligned. To align the stream, the framer requests nine bits of data until the octets (or time slots) of a frame are aligned to the 9-bit data bus. When aligned, the framer state machine 114 steps into the 'Aligned' state 318. The framer state machine 114 remains in this state until it goes out of synchronization (i.e., not aligned any more). In this case, the framer state machine returns to the 'Search first FAS' state 306, or the 'Init' state 302 when frame processing is disabled (framer turned off).

The invention described in the above detailed description is not intended to be limited to the specific form set forth herein, but is intended to cover such alternatives, modifications and equivalents as can reasonably be included within the spirit and scope of the appended claims.

What is claimed is:

1. A method for processing data, comprising:
receiving a combined clock-data stream according to a first clock domain, the combined clock-data stream including both clock signals and data signals;
dividing the combined clock-data stream into an independent clock stream and an independent data stream;
synchronizing the independent data stream to a second clock domain for processing by a data processor, the second clock domain being different from the first clock domain;
preserving a timing of the independent clock stream according to the first clock domain during processing of the independent data stream by the data processor;
recombining the independent clock stream and the processed independent data stream to form a recombined clock-data stream; and
re-synchronizing the recombined clock-data stream to the first clock domain.

2. The method of claim 1, wherein synchronizing the independent data stream to a second clock domain for processing by a data processor includes synchronizing the independent data stream to a second clock domain for processing by a framer state machine.

3. The method of claim 2, further comprising aligning n-bits of the independent data stream onto a m-bit data bus for processing by the framer state machine, where m and n are integers, and m>n.

4. The method of claim 3, wherein aligning n-bits of the independent data stream onto the m-bit data bus includes detecting whether a frame boundary of an incoming frame associated with the independent data stream is misaligned with respect to data transferred onto the m-bit data bus, and if the frame boundary is misaligned then aligning time slots of incoming frames onto the m-bit data bus.

5. The method of claim 4, wherein aligning time slots of incoming frames onto the m-bit data bus includes aligning p-bits of the independent data stream onto the m-bit data bus in subsequent data transfers until a given frame boundary is aligned with respect to a given time slot, wherein p is an integer, p>n and p≦m.

6. The method of claim 5, wherein n=8 and m=p=9.

7. The method of claim 2, wherein processing the independent data stream includes loading from a memory device and storing to a memory device context information associated with the independent data stream.

8. The method of claim 7, wherein processing the independent data stream further includes inserting an alarm or a framing pattern into the independent data stream.

9. A data processing system, comprising:
a clock-data pair to receive a combined clock-data stream according to a first clock domain, the combined clock-data stream including both clock signals and data signals;
a clock branch and a data branch to divide the combined clock-data stream into an independent clock stream and an independent data stream, the clock branch to preserve a timing of the independent clock stream according to the first clock domain during processing of the independent data stream by a data processor;
a first synchronizer to synchronize the independent data stream to a second clock domain for processing by the data processor, the second clock domain being different from the first clock domain;
a combiner to recombining the independent clock stream and the processed independent data stream to form a recombined clock-data stream; and
a second synchronizer to re-synchronizing the recombined clock-data stream to the first clock domain.

10. The system of claim 9, wherein the data processor is a framer state machine.

11. The system of claim 10, wherein the framer state machine aligns n-bits of the independent data stream onto a m-bit data bus for processing of the independent data stream, where m and n are integers, and m>n.

12. The system of claim 11, wherein the framer state machine further detects whether a frame boundary of an incoming frame associated with the independent data stream is misaligned with respect to data transferred onto the m-bit data bus, and if the frame boundary is misaligned then the framer state machine aligns time slots of incoming frames onto the m-bit data bus.

13. The system of claim 12, wherein the framer state machine aligns time slots of incoming frames onto the m-bit data bus including aligning p-bits of the independent data stream onto the m-bit data bus in subsequent data transfers until a given frame boundary is aligned with respect to a given time slot, wherein p is an integer, p>n and p≦n.

14. The system of claim 13, wherein n=8 and m=p=9.

15. The system of claim 11, wherein the framer state machine processes the independent data stream including loading from a memory device and storing to a memory device context information associated with the independent data stream.

16. The system of claim 15, wherein the framer state machine further processes the independent data stream including inserting an alarm or a framing pattern into the independent data stream.

17. A data processing system, comprising:
means for receiving a combined clock-data stream according to a first clock domain, the combined clock-data stream including both clock signals and data signals;
means for dividing the combined clock-data stream into an independent clock stream and an independent data stream;
means for synchronizing the independent data stream to a second clock domain for processing by a data processor, the second clock domain being different from the first clock domain;
means for preserving a timing of the independent clock stream according to the first clock domain during processing of the independent data stream by the data processor;
means for recombining the independent clock stream and the processed independent data stream to form a recombined clock-data stream; and
means for re-synchronizing the recombined clock-data stream to the first clock domain.

18. The system of claim 17, wherein the means for synchronizing the independent data stream to a second clock domain for processing by a data processor includes means for synchronizing the independent data stream to a second clock domain for processing by a framer state machine.

19. The system of claim 18, further comprising means for aligning n-bits of the independent data stream onto a m-bit data bus for processing by the framer state machine, where m and n are integers, and m>n.

20. The system of claim 19, wherein the means for aligning n-bits of the independent data stream onto the m-bit data bus includes means for detecting whether a frame boundary of an incoming frame associated with the independent data stream is misaligned with respect to data transferred onto the m-bit data bus, and if the frame boundary is misaligned then the means for aligning aligns time slots of incoming frames onto the m-bit data bus.

* * * * *

UNITED STATES PATENT AND TRADEMARK OFFICE
CERTIFICATE OF CORRECTION

PATENT NO. : 7,477,660 B1
APPLICATION NO. : 11/140380
DATED : January 13, 2009
INVENTOR(S) : Homer et al.

Page 1 of 1

It is certified that error appears in the above-identified patent and that said Letters Patent is hereby corrected as shown below:

In Col. 2, line 67, delete "and" and insert --any--.
In Col. 5, line 50, delete "$p \leq n$" and insert --$p \leq m$--.

Signed and Sealed this

Twenty-fourth Day of March, 2009

JOHN DOLL
*Acting Director of the United States Patent and Trademark Office*